US010174855B2

(12) United States Patent
Michnevitz et al.

(10) Patent No.: US 10,174,855 B2
(45) Date of Patent: Jan. 8, 2019

(54) PIN RELEASE THERMAL VALVE

(71) Applicant: Emerson Process Management Regulator Technologies Tulsa, LLC, Tulsa, OK (US)

(72) Inventors: Mark A. Michnevitz, Frisco, TX (US); Nathan A. Quinn, McKinney, TX (US); Travis Ellison, Tulsa, OK (US); James Myers, Tulsa, OK (US)

(73) Assignee: Emerson Process Management Regulator Technologies Tulsa, LLC, Tulsa, OK (US)

( * ) Notice: Subject to any disclaimer, the term of this patent is extended or adjusted under 35 U.S.C. 154(b) by 0 days.

(21) Appl. No.: 15/364,880

(22) Filed: Nov. 30, 2016

(65) Prior Publication Data

US 2017/0152960 A1 Jun. 1, 2017

Related U.S. Application Data

(60) Provisional application No. 62/260,962, filed on Nov. 30, 2015.

(51) Int. Cl.
*F16K 17/38* (2006.01)
*F16K 1/12* (2006.01)
*A62C 4/02* (2006.01)

(52) U.S. Cl.
CPC ............. *F16K 17/383* (2013.01); *F16K 1/12* (2013.01); *A62C 4/02* (2013.01)

(58) Field of Classification Search
CPC ................................. F16K 17/383; F16K 1/12
(Continued)

(56) References Cited

U.S. PATENT DOCUMENTS 878,658 A * 2/1908 Murray ................. F16K 17/383
137/75
1,005,677 A * 10/1911 Davison ............... F16K 17/383
137/75
(Continued)

FOREIGN PATENT DOCUMENTS

CH 575104 A5 4/1976
DE 3436582 A1 5/1985
(Continued)

OTHER PUBLICATIONS

International Search Report and Written Opinion for Application No. PCT/US2016/064059 dated Mar. 6, 2017.

*Primary Examiner* — P. Macade Nichols
(74) *Attorney, Agent, or Firm* — Marshall, Gerstein & Borun LLP

(57) ABSTRACT

A valve includes a valve body forming a channel defining a fluid flow path from inlet to outlet ports of the valve body via a gallery disposed therebetween, an opening disposed in communication with the gallery, a valve assembly at least partially disposed through the opening and in the gallery, and a fusible element. A valve disc of the valve assembly moves between a first position spaced from a valve seat of the valve body and a second position contacting the valve seat. The fusible element is coupled to and at least partly supported by the valve assembly to maintain the valve assembly in the first position. The fluid flow path allows fluid to flow through the valve body in a first direction and a second, opposite direction. The fusible element fails when contacted by fluid traversing the fluid flow path in the second direction, allowing the valve disc to move to the second position.

16 Claims, 3 Drawing Sheets

(58) Field of Classification Search
  USPC .......................................................... 137/75
  See application file for complete search history.

(56) References Cited

U.S. PATENT DOCUMENTS

| | | | | |
|---|---|---|---|---|
| 1,783,395 | A | * 12/1930 | Taylor | ............... F16K 17/383 |
| | | | | 137/75 |
| 3,730,205 | A | 5/1973 | Guimbellot | |
| 3,862,641 | A | 1/1975 | Follett | |
| 3,981,317 | A | 9/1976 | Strulik et al. | |
| 5,411,049 | A | * 5/1995 | Colvard | ............... E21B 21/10 |
| | | | | 137/515.7 |

FOREIGN PATENT DOCUMENTS

| | | | |
|---|---|---|---|
| FR | 2234501 | A1 | 1/1975 |
| FR | 2304013 | A1 | 10/1976 |
| NL | 7708847 | A | 3/1978 |

* cited by examiner

PIN RELEASE THERMAL VALVE

CROSS REFERENCE TO RELATED APPLICATIONS

This application claims the benefit of U.S. Provisional Application No. 62/260,962 (filed on Nov. 30, 2015 ). The entirety of the foregoing provisional application is incorporated by reference herein.

FIELD OF THE DISCLOSURE

The present disclosure generally relates to safety equipment in oil and gas environments and, more particularly, to thermal valves which minimize turbulent flow of fluids travelling therein.

BACKGROUND

In upstream oil and gas supply applications, oil is stored in a variety of storage tanks. During the transport of the oil from the tank to the upstream application, flammable gasses may be generated which are burned off by gas flares or flare stacks. At times, the velocity of vapors flowing towards the flare may be low enough to allow the flame from the flare to travel into the pipe in the opposite direction. Potentially catastrophic failures may occur if the flame is allowed to reach the storage tank.

Additionally, damaging detonations may occur in which the flame rapidly propagates the flow path in a manner resembling a shockwave. These detonations are oftentimes caused by turbulence-creating geometries such as bends, sharp turns, and other interruptions to the flow path.

To mitigate this risk, flame or deflagration arrestors may be implemented and disposed between the storage tank and the gas flare. In the event a flame propagates towards the storage tank, these flame arrestors block the flame from further advancing to the storage tank. However, these flame arrestors have a limited useful life and their performance may be compromised upon being exposed to flames for extended periods of time. Further, these flame arrestors may not be suitable to contain or limit flames caused by detonations due to their rapid propagation.

Thermal valves may be implemented to restrict the backwards propagation of gases towards the storage tank by limiting the supply of flame-generating fluids. However, conventional thermal valves may have configurations conducive to generating turbulence along the flow path, which in turn may lead to detonations.

BRIEF DESCRIPTION OF THE DRAWINGS

The above needs are at least partially met through provision of the pin release thermal valve described in the following detailed description, particularly when studied in conjunction with the drawings, wherein.

Figure 1:
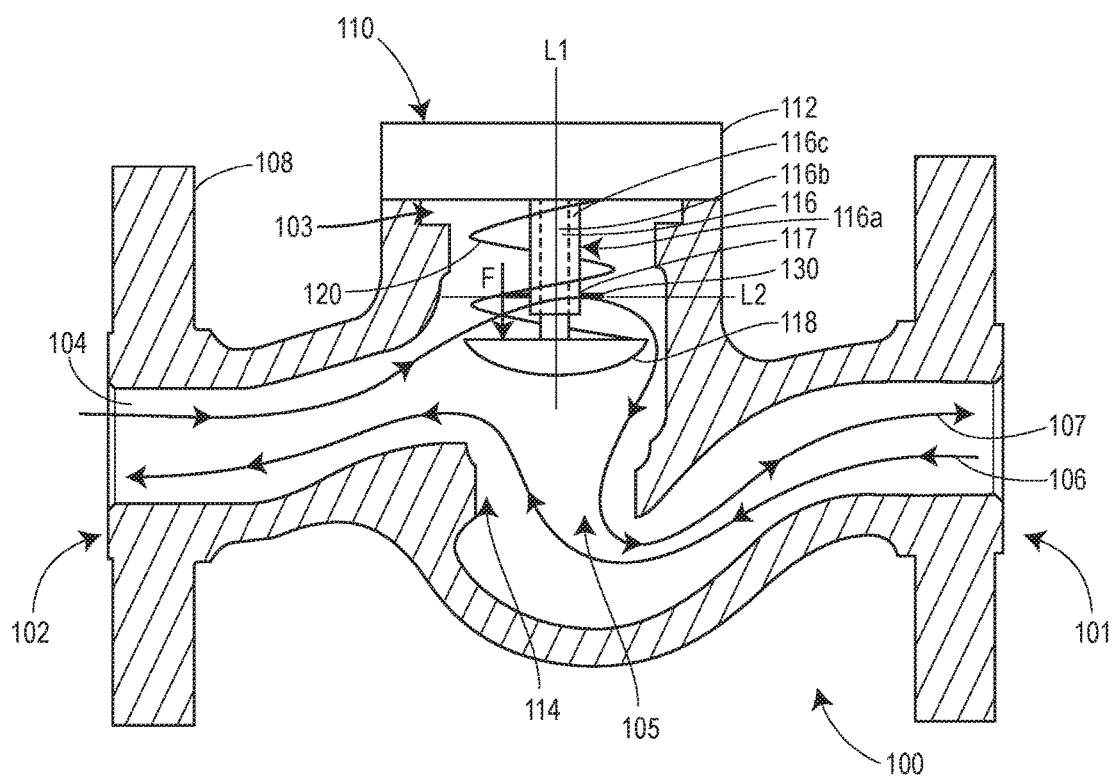
FIG. 1 comprises a schematic front cross-sectional view of an exemplary pin-release thermal valve in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

SUMMARY

Generally speaking, pursuant to these various embodiments, systems and approaches for a pin release thermal valve for use in oil and gas applications are provided and may include a valve body forming a channel that defines a fluid flow path that extends from an inlet port of the valve body to an outlet port of the valve body via a gallery of the valve body that is disposed between the inlet port and the outlet port. The valve body may further define an opening disposed in communication with the gallery. The valve may also include a valve assembly adapted to be at least partially disposed through the opening and in the gallery and a fusible element having a central longitudinal axis.

In one approach, the fluid flow path is adapted to allow a fluid to flow through the valve body in a first direction and a second direction opposite the first direction. A valve disc of the valve assembly moves between a first position spaced from a valve seat of the valve body and a second position that is in contact with the valve seat. The fusible element is adapted to be coupled to and at least partly supported by the valve assembly in the first position. Further, the fusible element is adapted to fail when contacted by a fluid traversing the fluid flow path in the second direction to allow the valve disc of the valve assembly to move to the second position.

In some approaches, the valve assembly may include a valve stem coupled to the valve disc. The valve stem may include a first telescoping component having a central longitudinal axis and may also form at least one opening through a cylindrical surface thereof and a second telescoping component having a central longitudinal axis aligned with the central longitudinal axis of the first telescoping component and may form at least one opening through a cylindrical surface thereof. In these approaches, the fusible element is disposed through the at least one opening of the first telescoping component and the at least one opening of the second telescoping component to maintain the valve assembly in the first position. In some aspects, the fusible element may include at least one exposed end protruding from the valve assembly when maintaining the valve assembly in the first position.

In an embodiment, the valve assembly may comprise a valve bonnet at least partially covering the opening of the valve body, the valve stem coupled to the valve bonnet, the valve disc coupled to the valve stem, and a valve spring at least partially disposed between the valve bonnet and the valve disc. The valve spring exerts a force on at least one of the valve stem, the fusible element, and the valve disc to urge the valve disc toward the second position. The valve spring further causes the valve disc to contact the valve seat upon the fusible element failing. The valve assembly may be removably disposed within the valve body.

In some embodiments, the fusible element is adapted to melt upon being contacted by the fluid traversing the fluid flow path in the second direction. The fusible element may be constructed of a material having a melting point between approximately 115° F. and 800° F. Further, the fusible element may comprise a generally cylindrically shaped member.

In some approaches, the first position of the valve assembly allows the fluid to move freely along the fluid flow path. In some forms, a majority of the fluid flow path is entirely vacant of physical obstructions when the valve assembly is in the first position. In these approaches, the second position of the valve assembly restricts fluid from moving along the fluid flow path.

In other embodiments, a valve assembly is provided which may include a valve bonnet adapted to at least partially cover an opening of the valve body, a valve stem coupled to the valve bonnet, a valve disc coupled to the valve stem opposite the valve bonnet, a fusible element having a central longitudinal axis, and a valve spring at least partially disposed between the valve bonnet and the valve disc. The valve stem and the valve disc are movable between a first position wherein the valve disc is spaced a first distance from the bonnet and a second position wherein the valve disc is spaced a second distance away from the valve bonnet, whereby the second distance is greater than the first distance. The fusible element is adapted to be coupled to and at least partly supported by the valve stem to maintain the valve stem and the valve disc in the first position. The valve spring exerts a force on at least one of the valve stem, the fusible element, and the valve disc, thereby urging the valve stem and the valve disc into the second position. Upon the fusible element failing, the valve spring is adapted to cause the valve stem and the valve disc to move to the second position.

The valve stem may comprise a first telescoping component having a central longitudinal axis and forming at least one opening on a cylindrical surface thereof. The valve stem may further comprise a second telescoping component having a central longitudinal axis aligned with the central longitudinal axis of the first telescoping component and forming at least one opening on a cylindrical surface thereof. In these examples, the at least one opening of the first telescoping component is concentric with the at least one opening of the second telescoping component when the valve stem and valve disc occupy the first position such that the fusible element is adapted to be inserted through the at least one opening of the first telescoping component and the at least one opening of the second telescoping component to maintain the valve stem and valve disc in the first position.

In some approaches, the central longitudinal axis of the fusible element is adapted to be substantially perpendicular to the central longitudinal axes of the first and second telescoping components when the fusible element is at least partly supported by the valve stem. The fusible element may be constructed of a material having a melting point temperature of approximately 115and 800degrees Fahrenheit. The fusible element may further be adapted to be at least partly supported by the valve stem via a shear force being generated by the valve spring exerting force on the valve stem. The fusible element may further be adapted to have at least one exposed end protruding from the valve stem when maintaining the valve assembly in the first position.

So configured, the valve assembly and other components are substantially removed from the fluid flow path, thus creating a smoother flow, which in turn reduces turbulence and the occurrence of detonation events. In these examples, it is understood that the thermal valve will be used upstream of a flame arrestor commonly used in existing systems. While the thermal valve may not prevent all flames from progressing to the flame arrestor, the valve's closure will ultimately shut off the remaining gas flow which will result in the flame burning out. Further, upon the occurrence of a deflagration event in which the fusible element melts or fails, it may be easily replaced by inserting a new fusible element through the opening of the valve stem. Additionally, because portions of the valve assembly may be a unitary design inserted into the opening of the valve body, it may be easily replaceable should the fusible element and/or other components be damaged beyond repair by a deflagration event.

DETAILED DESCRIPTION

Referring now to the drawings, a valve 100 for an oil and gas tank is provided. The valve 100 includes a valve body 108, a valve assembly 110, and a fusible element 130 or pin. The valve body 108 forms a bonnet opening 103 and further forms a channel 104 which defines a fluid flow path extending from an inlet port 101 of the valve body 108 to an outlet port 102 of the valve body 108 via a gallery 105. The fluid may flow along the channel 104 in a first direction 106 (e.g., from the inlet port 101 to the outlet port 102) or a second direction 107 (e.g., from the outlet port 102 to the inlet port 101). The valve 100 also forms a valve seat 114 located in the gallery 105.

Generally speaking, the valve 100 is adapted to be disposed between a storage tank and flame arrestor (not shown) and upstream components (not shown) for use and/or processing. The valve body 108 may be constructed of any number of metallic materials and is formed using any number of methods, such as, for example, extruding, forging, and the like. Other examples are possible. It is understood that the valve 100 may include any number of additional components not described herein for the sake of brevity.

It is understood that by the term "fluid" and as described herein, it is meant any suitable liquids and/or gases which may be stored and utilized in oil and gas applications. For example, suitable fluids may include Group D gases such as methane, propane, and/or natural gas. Other examples are possible. These fluids may generate flames or deflagration events upon experiencing a substantial amount of turbulent flow. Other examples are possible.

The valve assembly 110 may include a valve bonnet 112 adapted to at least partially cover the bonnet opening 103 of the valve body 108, a valve stem 116, a valve disc 118, and a valve spring 120. The individual components of the valve assembly 110 may be constructed of any number of suitable materials, such as, for example, metals, metal alloys, polymers, and the like. Other examples are possible.

In some examples, the valve bonnet 112 is a generally planar component which may serve as a partial or complete seal to the bonnet opening 103. The valve bonnet 112 may be coupled to the valve body 108 using any number of components such as, for example, nuts, bolts, screws, clamps, and the like. Other examples are possible.

The valve stem 116 may be coupled to the valve bonnet 112 using any number of suitable components and techniques. The valve stem 116 may have a central longitudinal axis L1 and may include an opening 117 or openings extending along a lateral axis L2 which is transverse to the longitudinal axis L1. In the disclosed versions, the lateral axis L2 is approximately perpendicular to the central longitudinal axis L1 of the valve stem 116. The valve stem 116 is adapted to move between a first position (FIG. 1) and a second position (FIG. 2) via any number of components. As will be described, the first position may be described as a "loaded" position and the second position may be described as an "activated" position. For example, the valve stem 116 may comprise a telescopic tube element 116A including a first telescoping component 116B (also referred to as an "inner tube") slidably disposed within a second telescoping component 116C (also referred to as an "outer tube"). In the disclosed embodiment, the outer tube 116C is fixed to the valve bonnet 112 and the inner tube 116B is axially displaceable relative to the outer tube 116C, as will be described. In other versions, the inner tube 116B can be fixed to the valve bonnet 112 and the outer tube 116C could be slidably displaceable relative to the inner tube 116B and the valve bonnet 112. In still other versions, the valve stem 116 may include more than two telescoping components (also referred to as "tubes") while achieving the same desired purpose.

In this example, the inner tube 116B and the outer tube 116C have a common central longitudinal axis L1. The inner tube 116B is dimensioned such that it may be inserted into the outer tube 116C. In some examples, the inner tube 116B may have an outer diameter of approximately 5 to 15 millimeters, and more specifically, approximately 11 millimeters. Furthermore, the outer tube 116C may have an inner diameter of approximately 7 to 17 millimeters, and more specifically, approximately 13 millimeters. Other examples are possible. Further, both the inner tube 116B and the outer tube 116C may have aligned openings 117 along their lateral axes L2 when the valve stem 116 is in the first, loaded position. Other examples are possible.

The valve seat 114 is at least partially formed by the valve body 108 and is disposed between the inlet port 101 and the outlet port 102 of the valve body 108. In some examples, the valve seat 114 may be a ledge or platform having a cross sectional shape identical or similar to that of the channel 104. It is understood that the valve seat 114 may be an integral component of the valve body 108 or may include separate components such as a seat ring attached to the valve body 108 using any number of methods such as threads, screws, and the like. Other examples are possible.

The valve disc 118 is adapted to be coupled to the valve stem 116 and, in particular, a distal end of the inner tube 116B of the disclosed valve stem 112. The valve spring 120 is adapted to be at least partially disposed between the valve bonnet 112 and the valve disc 118 and is adapted to exert a force (denoted by "F" in the drawings) on at least one of the valve stem 116, the fusible element 130, and the valve disc 118. In the disclosed version, the valve spring 120 exerts a downward force on the valve disc 118 and inner tube 116B of the valve stem 112, which in turn applies a shear load to the fusible element 130 as will be described.

The fusible element 130 or link may be any type of device capable of being fused or melted at a desired temperature or range of temperatures. The fusible element 130 may be constructed of any number of materials (e.g., tin/bismuth alloys, tin/zinc/lead, and bismuth, to name a few) and may be chosen based on the material's physical properties such as melting point, shear strength, bending resistance, etc. One example of a suitable melting temperature is between approximately 100° F. and 1000° F., though it is understood that other examples, such as between approximately 115° F. and 800° F. are possible. The fusible element 130 may be generally cylindrically shaped and thus have a generally circular cross sectional area. It is understood that any cross sectional shape may be used as desired. The fusible element 130 may be inserted into the opening or openings 117 of the valve stem 116 to act as a lock or stop which restricts the inner tube 116B of the valve stem 116 from moving along the lateral axis L1 relative to the outer tube 116C.

In operation, and as illustrated in FIG. 1, valve stem 116 and valve disc 118 are moved to the first position, which causes the valve spring 120 to compress. The fusible element 130 is inserted into the opening 117 of the valve stem 116 and therefore resides along the lateral axis L2 which in the disclosed example is generally perpendicular to the longitudinal axis L1 of the valve stem 116 to restrict movement of the inner tube 116B and valve disc 118 relative to the outer tube 116C. Because the valve spring 120 is in a compressed state, an upper peripheral edge portion of the openings 117 in the inner tube 116B of the valve stem 116 will exert a downward force F on the portion of the fusible element 130 residing within the openings 117 in the inner tube 116B, and a lower peripheral edge portion of the openings 117 in the outer tube 116C of the valve stem 116 will exert an equal and opposite reactionary force on the adjacent portion of the fusible element 130 residing within the openings 117 in the outer tube 116C. These combined forces will in turn maintain the fusible element 130 within the opening 117 as well as the valve assembly 110 in the first or "loaded" position. Accordingly, the valve assembly 110 is maintained in this loaded position without the valve stem 116, fusible element 130, or valve spring 120 interacting with, contacting, or bearing against portions of the valve body 108 for support. A shear force is exerted on at least a portion of the fusible element 130 when the valve stem 116 is in this first position. The valve bonnet 112, the valve stem 116, the valve disc 118, and the valve spring 120 may then be inserted into the bonnet opening 103 of the valve body 108 and coupled thereto via the valve bonnet 112.

When the valve assembly 110 is in the first position, fluid may move freely along the first fluid flow path 106. This is because the valve assembly 110 is spaced away from the valve seat 114 and substantially out of the fluid flow path 106. Said another way, a substantial part of the fluid flow path through the gallery 105 of the valve body 108 where the valve assembly 110 is in the first position is entirely free of physical obstructions. The first direction 106 of the fluid flow path may be used to transport fluids from the storage tank to upstream components for use and/or processing. When a fluid moves along the fluid flow path in the first direction 106, the fusible element 130 remains substantially out of contact with the fluid. In some embodiments, a substantial portion of the components in the valve assembly 110 also remain out of contact with the fluid during movement along the first direction 106. As such, the fluid flow is smooth and generally free of interruptions and/or bends which may create turbulent flow. It is understood that in some embodiments, the fluid moving along the first fluid flow path 106 may contact any or all of the fusible element 130 and any number of components in the valve assembly 110, but the fluid travel may still remain generally free of turbulence.

Figure 2:
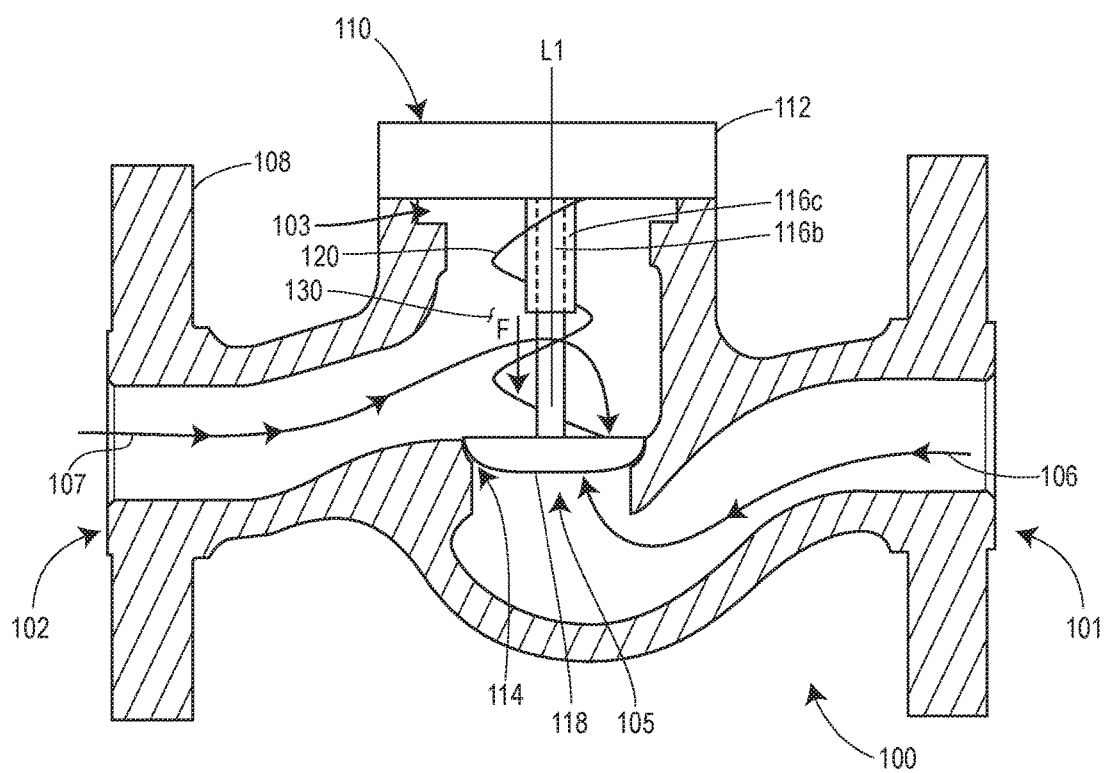
FIG. 2 comprises a schematic front cross-sectional view of the exemplary pin-release thermal valve of FIG. 1 in an activated position in accordance with various embodiments of the invention.

Turning to FIG. 2, in the event of a deflagration event in which a flame and its corresponding fluids travel back towards the storage tank and into the valve 100 in the second direction 107 of the fluid flow path, the fluid may contact the fusible element 130. Because the fusible element 130 is selected having desired melting parameters (e.g., between approximately 115 and approximately 800 degrees Fahrenheit), the propagation of the fluid along the second fluid flow path 107 will cause the fusible element 130 to melt. As such, the force exerted by the spring 120 will eventually overcome the resistive force of the fusible element 130 and move the valve assembly 110 from the first position to the second position. When a portion of the valve assembly 110 moves to the second, activated position, the inner tube 116B moves axially relative to the outer tube 116C such that the valve disc 118 contacts the valve seat 114 and create a seal which restricts fluids from propagating beyond the valve seat 114 in the second direction 107. In the disclosed version, the inner tube 116B slides partly out of the outer tube 116C as the valve stem 116 moves from the first position to the second position. As a result, while an amount of fluid and/or flame may have propagated beyond the valve stem 114 before the valve assembly 110 moved to the second position, the flame will eventually burn out due to a lack of fluid supplied thereto. Further, in some examples, when the valve assembly 110 is in the second position, movement along the fluid flow path in the first direction 106 may also be restricted.

Furthermore, because the first direction 106 and the second direction 107 contain a minimal number of changes in overall direction, interruptions, edges, and/or other flowdisturbing components, the chances of generating turbulent flow are minimized. As a result, even in the event of a deflagration event in which a fluid is propagating in the second direction 107, the likelihood of creating a potentially catastrophic detonation event is substantially reduced. Further, despite portions of the valve assembly 110 being disposed at a position which may be contacted by a fluid propagating in the second direction 107, the occurrence detonation events remains unlikely.

Because the valve assembly 110 may be readily coupled together, it is possible to easily replace damaged components. For example, in the event that a deflagration event occurs in which a fluid propagates in the second direction 107, while the fusible element 130 may have melted away, the valve assembly may be reused by removing the valve bonnet 112, the valve stem 116, the valve disc 118, and the valve spring 120 by decoupling the valve bonnet 112 from the valve body 108. The valve stem 116 may then be reset in the first "loaded" position, and a new fusible element 130 may be inserted into the opening 117. The valve assembly 110 may then be reinserted into the bonnet opening 103 of the valve body 108.

Figure 3:
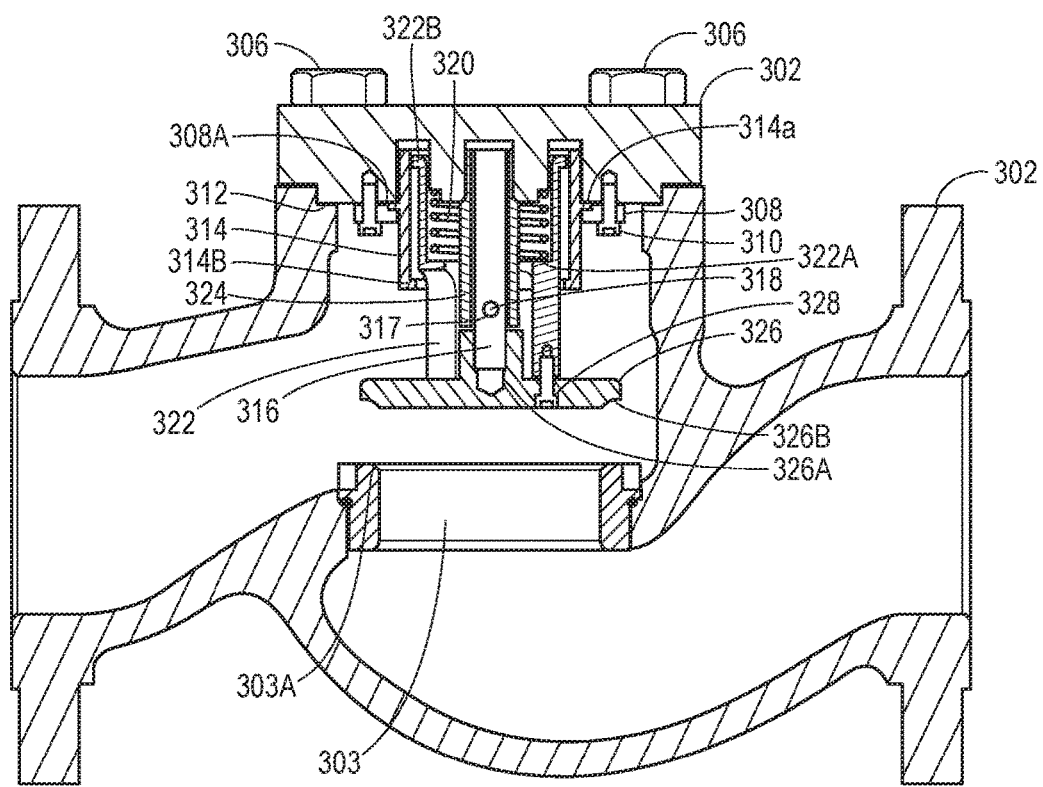
FIG. 3 comprises a schematic front elevation cross-sectional view of an exemplary version of a pin-release thermal valve in accordance with various embodiments of the invention.

Turning to FIG. 3, a detailed schematic of an alternative valve 300 is provided. The valve 300 includes a valve body 302, an orifice 303, a bonnet 304, bonnet bolts 306, an outer guide clamp 308, outer guide clamp screws 310, a gasket 312, an outer guide 314, a stem 316, a stem opening 317, a fusible pin 318, a spring 320, a spring support 322, a stem guide 324, a disc or pallet 326, and pallet screws 328.

The valve body 302 and the bonnet 304 may be made of any number of suitable metals such as stainless steel (e.g., 316 stainless steel). The gasket 312 may be constructed of graphite, rubbers, or any other suitable materials and may be flame-resistant. The gasket 312 is disposed in an opening of the valve body 302 to create a seal to prevent leakage of pipe line fluid to the atmosphere. The bonnet 304 is coupled to the valve 302 via any number of bonnet bolts 306, which may be constructed of metals such as stainless steel (e.g., a combination 304/316 stainless steel yield material). Other examples are possible. The bonnet 304 is responsible for securing the remainder of the valve assembly to the valve 302.

The outer guide 314 may be a cylindrical tube-like structure adapted to couple to the bonnet and is adapted to prevent the spring support 322 from extending past a certain point and will be described in further detail below. The outer guide 314 may be made of any number of suitable metals such as stainless steel (e.g., 316 stainless steel). The outer guide 314 may be coupled to the bonnet 304 via the outer guide clamp 308 using the outer guide clamp screws 310. It is understood that any number of outer guide clamp screws 310 may be used to couple the outer guide 314 to the bonnet 304. The outer guide 314 may include a first notch or protrusion 314A which is adapted to contact a ledge 308A of the outer guide clamp. The outer guide clamp 308 and outer guide clamp screws 310 may be made of any number of suitable metals such as stainless steel (e.g., 316 stainless steel). Other examples are possible.

The spring 320 may be constructed of any suitable material such as a metal and/or metallic alloy (e.g., an austenite nickel-chromium-based superalloy). Other examples are possible. The spring 320 is positioned against the bonnet 304 on a first end and is supported by a ledge 322A of the spring support 322 on a second end thereof. The spring support 322 may be made of any number of suitable metals such as stainless steel (e.g., 316 stainless steel). Other examples are possible.

Disposed inside a central portion of the spring 320 is a stem guide 324. The stem guide 324 may be made of any number of suitable metals such as stainless steel (e.g., 316 stainless steel) and may be coupled to the bonnet 304 via a threaded connection or other suitable methods. The stem guide 324 is adapted to guide the stem 316 disposed therein as the pallet 326 moves between a first and a second position.

The stem 316 and the pallet 326 may be constructed of any number of suitable materials such as stainless steel (e.g., 410 stainless steel or other suitable materials). The stem may be coupled to the pallet 326 via any number of connections, such as a threaded connection, a press-fit connection via a central bore 326A in the pallet, or any other suitable method. The pallet 326 may be coupled to the spring support 322 via pallet screws 328 to ensure forces exerted by the spring 320 are evenly distributed on the pallet 326. As such, the pallet 326 may include a counter bore to create a planar surface.

The fusible pin 318 may be an elongated component constructed of any suitable material or materials such as a bismuth/tin mixture which may be modified to provide different melting temperatures. It is understood that the fusible pin 318 may be any suitable shape such as cylindrical or cuboidal. Other examples are possible. The fusible pin is adapted to be inserted into an opening 317 of the stem 316 and an opening of the stem guide 324. By inserting the fusible pin 318 into these openings, the assembly is locked in a first position whereby the spring 320 causes a shear force to be exerted on the fusible pin 318.

Upon the fusible pin 318 melting due to a deflagration event, the spring 320 causes the stem 316 and pallet 326 to move towards the orifice 303. This lateral movement is guided by the stem guide 324, spring support 322, and the outer guide 314 to ensure proper alignment of the pallet 326. The orifice 303 includes a parabolic surface 303A which is adapted to contact a corresponding parabolic surface 326B on the pallet 326 to ensure the pallet 326 maintains contact with the edge of the orifice 303 to seal and stop flow from traveling through the valve.

When it is desired to remove the valve assembly from the valve 302, the bonnet bolts 306 may be unbolted and the bonnet 304 and the assembly may be removed from the opening. During removal, a second notch 314B of the outer guide 314 contacts a corresponding notch 322B or lip of the spring support 322 to capture the entire assembly for removal.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A valve comprising:
a valve body forming a channel defining a fluid flow path extending from an inlet port of the valve body to an outlet port of the valve body via a gallery of the valve body that is disposed between the inlet port and the outlet port, the valve body further defining an opening disposed in communication with the gallery, wherein the fluid flow path is adapted to allow a fluid to flow through the valve body in a first direction and a second direction opposite the first direction;
a valve assembly adapted to be at least partially disposed through the opening and in the gallery of the valve body, wherein a valve disc of the valve assembly moves between a first position spaced from a valve seat of the valve body and a second position in contact with the valve seat; and
a fusible element having a central longitudinal axis and being adapted to be coupled to and at least partly supported by the valve assembly to maintain the valve assembly in the first position;
wherein the fusible element is adapted to fail when contacted by a fluid traversing the fluid flow path in the second direction to allow the valve disc of the valve assembly to move to the second position;
wherein the valve assembly further comprises a valve stem coupled to the valve disc, the valve stem comprising a first telescoping component having a central longitudinal axis and forming at least one opening through a first cylindrical surface, the valve assembly further comprising a second telescoping component having a central longitudinal axis aligned with the central longitudinal axis of the first telescoping component and forming at least one opening through a second cylindrical surface; and
wherein the fusible element is disposed through the at least one opening of the first telescoping component and the at least one opening of the second telescoping component to maintain the valve assembly in the first position;
wherein the fusible element is constructed of a material having a melting point between 115 and 800 degrees Fahrenheit and is adapted to melt upong being contacted by the fluid traversing the fluid flow path in the second direction.

2. The valve of claim 1, wherein the fusible element includes at least one exposed end protruding from the valve assembly when maintaining the valve assembly in the first position.

3. The valve of claim 1, wherein the valve assembly comprises:
a valve bonnet at least partially covering the opening of the valve body;
the valve stem coupled to the valve bonnet;
the valve disc coupled to the valve stem; and
a valve spring at least partially disposed between the valve bonnet and the valve disc, the valve spring exerting a force on at least one of the valve stem, the fusible element, and the valve disc to urge the valve disc toward the second position;
wherein the valve spring causes the valve disc to contact the valve seat upon the fusible element failing.

4. The valve of claim 1, wherein the valve assembly is removably disposed in the valve body.

5. The valve of claim 1, wherein the fusible element comprises a generally cylindrically shaped member.

6. The valve of claim 1, wherein the first position of the valve assembly allows the fluid to move freely along the fluid flow path.

7. The valve of claim 1, wherein the second position of the valve assembly restricts fluid from moving along the fluid flow path.

8. The valve of claim 1, wherein a majority of the fluid flow path is entirely vacant of physical obstructions when the valve assembly is in the first position.

9. A valve assembly, comprising:
a valve bonnet adapted to at least partially cover an opening of a valve body;
a valve stem coupled to the valve bonnet;
a valve disc coupled to the valve stem opposite the valve bonnet, the valve stem and the valve disc movable between a first position wherein the valve disc is spaced a first distance from the valve bonnet and a second position wherein the valve disc is spaced a second distance away from the valve bonnet, the second distance greater than the first distance;
a fusible element having a central longitudinal axis, the fusible element adapted to be coupled to and at least partly supported by the valve stem to maintain the valve stem and the valve disc in the first position;
a valve spring at least partially disposed between the valve bonnet and the valve disc, the valve spring exerting a force on at least one of the valve stem, the fusible element, and the valve disc urging the valve stem and the valve disc into the second position;
wherein upon the fusible element failing, the valve spring is adapted to cause the valve stem and valve disc to move to the second position; and
wherein the valve stem comprises a first telescoping component having a central longitudinal axis and forming at least one opening on a first cylindrical surface, the valve stem further comprising a second telescoping component having a central longitudinal axis aligned with the central longitudinal axis of the first telescoping component and forming at least one opening on a second cylindrical surface, wherein the at least one opening of the first telescoping component is concentric with the at least one opening of the second telescoping component when the valve stem and valve disc occupy the first position such that the fusible element is adapted to be inserted through the at least one opening of the first telescoping component and the at least one opening of the second telescoping component to maintain the valve stem and valve disc in the first position.

10. The valve assembly of claim 9, wherein the central longitudinal axis of the fusible element is adapted to be substantially perpendicular to the central longitudinal axes of the first and second telescoping components when the fusible element is at least partly supported by the valve stem.

11. The valve assembly of claim 9, wherein the fusible element is constructed of a material having a melting point temperature of approximately 115 and 800 degrees Fahrenheit.

12. A valve assembly, comprising:
a valve bonnet adapted to at least partially cover an opening of a valve body;
a valve stem coupled to the valve bonnet;
a valve disc coupled to the valve stem opposite the valve bonnet, the valve stem and the valve disc movable between a first position wherein the valve disc is spaced a first distance from the valve bonnet and a second position wherein the valve disc is spaced a second distance away from the valve bonnet, the second distance greater than the first distance;
a fusible element having a central longitudinal axis, the fusible element adapted to be coupled to and at least partly supported by the valve stem to maintain the valve stem and the valve disc in the first position;
a valve spring at least partially disposed between the valve bonnet and the valve disc, the valve spring exerting a force on at least one of the valve stem, the fusible element, and the valve disc urging the valve stem and the valve disc into the second position;
wherein upon the fusible element failing, the valve spring is adapted to cause the valve stem and valve disc to move to the second position; and
wherein the fusible element is adapted to be at least partly supported by the valve stem via a shear force being generated by the valve spring exerting force on the valve stem.

13. A valve assembly, comprising:
a valve bonnet adapted to at least partially cover an opening of a valve body;
a valve stem coupled to the valve bonnet;
a valve disc coupled to the valve stem opposite the valve bonnet, the valve stem and the valve disc movable between a first position wherein the valve disc is spaced a first distance from the valve bonnet and a second position wherein the valve disc is spaced a second distance away from the valve bonnet, the second distance greater than the first distance;
a fusible element having a central longitudinal axis, the fusible element adapted to be coupled to and at least partly supported by the valve stem to maintain the valve stem and the valve disc in the first position;
a valve spring at least partially disposed between the valve bonnet and the valve disc, the valve spring exerting a force on at least one of the valve stem, the fusible element, and the valve disc urging the valve stem and the valve disc into the second position;
wherein upon the fusible element failing, the valve spring is adapted to cause the valve stem and valve disc to move to the second position; and
wherein the fusible element is adapted to have at least one exposed end protruding from the valve stem when maintaining the valve assembly in the first position.

14. A valve, comprising:
a valve body forming a channel defining a fluid flow path extending from an inlet port of the valve body to an outlet port of the valve body via a gallery of the valve body that is disposed between the inlet port and the outlet port, wherein the fluid flow path is adapted to allow a fluid to flow in a first direction and a second direction opposite the first direction, the valve body further defining an opening in communication with the gallery;
a valve seat at least partially formed by the valve body, the valve seat disposed at a position along the fluid flow path between the inlet and the outlet port; and
a valve assembly at least partially disposed in the gallery of the valve body, the valve assembly comprising:
a valve bonnet at least partially covering the opening of the valve body;
a valve stem coupled to the valve bonnet, the valve stem including a central longitudinal axis and an opening extending through the valve stem along an axis transverse to the central longitudinal axis;
a valve disc coupled to the valve stem and movable between a first position spaced from the valve seat and a second position in contact with the valve seat;
a valve spring at least partially disposed between the valve bonnet and the valve disc, the valve spring exerting a force on at least one of the valve stem, the fusible element, and the valve disc urging the valve disc toward the valve seat; and
a fusible element having a central longitudinal axis, the fusible element adapted to be coupled to and at least partly supported by the valve stem to maintain the valve assembly in a first position;
wherein upon the fusible element failing under contact with a fluid traversing the fluid flow path in the second direction, the valve spring causes the valve disc to move to the second position and contact the valve seat to restrict fluid from flowing in the first direction and the second direction.

15. The valve of claim 14, wherein the fusible element is constructed of a material having a melting point temperature of approximately 115 and 800 degrees Fahrenheit.

16. The valve of claim 14, wherein the fusible element is adapted to be at least partly supported by the valve stem via a shear force being applied by the valve spring.

* * * * *

UNITED STATES PATENT AND TRADEMARK OFFICE
CERTIFICATE OF CORRECTION

PATENT NO. : 10,174,855 B2  
APPLICATION NO. : 15/364880  
DATED : January 8, 2019  
INVENTOR(S) : Mark A. Michnevitz et al.

Page 1 of 1

It is certified that error appears in the above-identified patent and that said Letters Patent is hereby corrected as shown below:

In the Specification

At Column 1, Line 7, "2015 )." should be -- 2015). --.

At Column 3, Line 63, "115and 800degrees" should be -- 115 and 800 degrees --.

At Column 5, Line 32, "5to" should be -- 5 to --.

At Column 5, Line 53, "valve stem 112." should be -- valve stem 116. --.

At Column 5, Line 60, "valve stem 112," should be -- valve stem 116, --.

At Column 8, Line 1, "stccl yicld matcrial)." should be -- steel yield material). --.

In the Claims

At Column 9, Line 59, "upong" should be -- upon --.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*